United States Patent
Wilt et al.

(10) Patent No.: US 8,590,717 B2
(45) Date of Patent: Nov. 26, 2013

(54) RAILROAD FREIGHT CAR DRAFT GEAR

(75) Inventors: Donald E. Wilt, Batavia, IL (US); Keith A. Salis, Clare, IL (US)

(73) Assignee: Miner Enterprises, Inc., Geneva, IL (US)

( * ) Notice: Subject to any disclaimer, the term of this patent is extended or adjusted under 35 U.S.C. 154(b) by 94 days.

(21) Appl. No.: 13/068,599

(22) Filed: May 16, 2011

(65) Prior Publication Data

US 2012/0292279 A1 Nov. 22, 2012

(51) Int. Cl.
*B61G 9/00* (2006.01)

(52) U.S. Cl.
USPC ............. 213/22; 213/40 R; 213/33; 213/32 R (58) Field of Classification Search
USPC ....... 213/22, 23, 24, 32 R, 33, 34, 40 R, 40 D
See application file for complete search history.

(56) References Cited

U.S. PATENT DOCUMENTS

| | | | | |
|---|---|---|---|---|
| 1,894,716 A | * | 1/1933 | Sproul | 267/203 |
| 2,667,277 A | * | 1/1954 | Mulcahy | 213/32 R |
| 3,581,909 A | * | 6/1971 | Peterson | 213/34 |
| 4,198,037 A | | 4/1980 | Anderson | |
| 4,304,397 A | * | 12/1981 | Zanow | 267/201 |
| 4,576,295 A | | 3/1986 | Carlstedt | |
| 4,591,059 A | * | 5/1986 | Hammarlund | 213/32 R |
| 4,735,328 A | * | 4/1988 | Carlstedt | 213/33 |
| 4,960,215 A | * | 10/1990 | Carlstedt | 213/33 |
| 5,104,101 A | | 4/1992 | Anderson et al. | |
| 5,351,844 A | * | 10/1994 | Carlstedt | 213/44 |
| 6,478,173 B2 | * | 11/2002 | Carlstedt | 213/32 C |
| 6,488,162 B1 | | 12/2002 | Carlstedt | |
| 6,520,360 B1 | | 2/2003 | Withall et al. | |
| 6,792,871 B2 | * | 9/2004 | O'Donnell et al. | 104/16 |
| 6,796,448 B1 | * | 9/2004 | Wilt et al. | 213/40 R |
| 6,862,999 B2 | * | 3/2005 | O'Donnell et al. | 105/199.3 |
| 6,877,623 B2 | | 4/2005 | Salis | |
| 7,044,061 B2 | * | 5/2006 | O'Donnell et al. | 105/199.3 |
| 7,624,884 B2 | * | 12/2009 | Palermo et al. | 213/22 |
| 8,328,030 B2 | * | 12/2012 | Kontetzki | 213/4 |
| 2010/0059470 A1 | | 3/2010 | Carlstedt et al. | |
| 2012/0292279 A1 | * | 11/2012 | Wilt et al. | 213/22 |

FOREIGN PATENT DOCUMENTS

RU 87765 10/2009

* cited by examiner

*Primary Examiner* — Jason C Smith (74) *Attorney, Agent, or Firm* — Law Office of John W. Harbst (57) ABSTRACT

A railroad freight car multipiece spring seat assembly including a spring seat, a top plate, and a spring. The spring seat is adapted to operably engage one end of a spring assembly in a railroad freight car draft gear. The top plate is adapted to operably engage with each of a plurality of friction shoes arranged in the railroad freight car draft gear. The spring of the multipiece spring seat assembly is operably disposed between the spring seat and the top plate.

33 Claims, 6 Drawing Sheets

FIG.10

RAILROAD FREIGHT CAR DRAFT GEAR

FIELD OF THE INVENTION DISCLOSURE

This invention disclosure generally relates to railroad freight car draft gears and, more specifically, to a railroad draft gear having a multipiece spring seat assembly arranged in operable combination therewith.

BACKGROUND

Railroad freight car draft gears have been used for many years at opposite ends of a railcar to absorb and cushion impact forces. Most railcar draft gears include a housing having an inner tapered bore at an open end, an elongated spring disposed within the housing, a series of metal friction shoes or members arranged in the tapered bore of the housing and movable against the spring upon compression of the draft gear, and a wedge or actuator disposed in operable combination with the friction members such that impact blows directed against the wedge are transferred axially to the spring and radially to the housing. In most railcar draft gears, a spring seat is arranged between an end portion of each friction member and the spring.

Recently, elastomeric materials have been used and accepted as replacements for steel springs. One elastomeric spring assembly offering beneficial results is disclosed in U.S. Pat. No. 5,351,844 to R. A. Carlstedt and includes multiple elastomeric spring pads stacked in axial relation relative to each other. Such a spring assembly has been successfully used for years in combination with railcar draft gears.

During their operation, and particularly while assembling a train consist in a railyard, the railcars experience high impact loads. While conventional draft gears have high shock absorbing capacities and capabilities, it is desirable for such draft gears to furthermore operate such that they absorb and return forces imparted thereto over a relatively consistent hysteretric force/travel curve which is relatively free from impact spikes.

Besides absorbing, storing and returning energy, one of primary functions of the draft gear spring is to maintain the friction shoes in sliding relationship relative to the inner tapered bore in the draft gear housing. While having numerous advantages over metal springs, and although they are capable of absorbing relatively high impact loads imparted thereto, the elastomeric material used to form the draft gear spring tends to respond slower to the relatively high compressive forces applied thereto than metal springs. That is, elastomeric springs used in draft gears are typically slower than metal springs in returning to their nominal or original working form after absorbing a relatively high impact load. As such, and in reaction to a relatively high impact load being applied thereto during the course of normal operation of the draft gear, the inability of the elastomeric spring to quickly return to its original shape adversely affects the positioning and relationship of the metal friction shoes within the inner tapered friction bore of the draft gear housing. As such, and when another relatively high impact or force is directed against the draft gear before the draft gear spring can totally recover from the previous impact load being directed against it, the overall performance of the draft gear is affected.

The railcar draft gear is arranged within a pocket in the railcar and extends generally parallel to a longitudinal axis of the railcar. Accordingly, when the railcar travels through a curve, the railcar tends to impart unequal forces to a free end of the wedge or actuator extending beyond the housing of the draft gear. Such unequal forces applied to the free end of the wedge or actuator on the draft gear are also transferred to the friction members or shoes which tends to cause some shoes to slide axially inwardly relative to the free end of the draft gear more than others. The spring seat of heretofore known railcar draft gears cannot and does not compensate for the unequal axial displacement of the friction members during performance of the draft gear which also results in undesirable overall performance of the railcar draft gear.

Thus, there remains a continuing need and desire to provide a railcar draft gear which is economically designed to have high shock absorbing capacities and capabilities while offering enhanced performance.

SUMMARY

In view of the above, and in accordance with one aspect, there is provided a railroad freight car draft gear including a hollow housing having an open end and which is closed toward a second end, with the housing defining a longitudinal axis for the draft gear. A series of friction members are radially spaced about the longitudinal axis and are arranged in operable combination with the open end of the housing. A wedge is arranged for axial movement relative to the open end of the housing and against which an exterior force can be applied. The wedge is arranged in operable combination with the friction members. An elongated spring assembly is disposed within the housing for storing energy applied to the wedge during axial compression of the draft gear. A first end of the spring assembly is arranged in contacting relation with the closed end of the housing and a second end abuts against a multipiece spring seat assembly arranged within the housing. The spring seat assembly includes a spring seat extending generally normal to the longitudinal axis of the draft gear. The spring seat assembly also includes a top plate arranged between the spring seat and each friction member. A spring is operably disposed between the spring seat and the top plate for applying a secondary spring force to each of the friction members whereby ensuring a rapid return of all the friction members to an operational position relative to the draft gear housing following a relatively high impact load being directed against the draft gear.

Preferably, at least one of the spring seat and the top plate has, in combination with the spring of the spring seat assembly, cooperating instrumentalities for positioning the spring relative to the spring seat assembly. In one form, the spring seat defines a pocket for receiving and accommodating one end of the spring. A marginal edge of the pocket defined by the spring seat preferably has a series of radially spaced upright supports arranged thereabout. When the spring seat assembly is operably arranged within the draft gear housing, the supports on the spring seat preferably underlie both the top cap of the spring set assembly and a lower end of the friction members such that an axial force directed against the top cap is transferred to the spring seat. To facilitate assembly of the spring seat assembly within the draft gear housing, the spring seat preferably has an indicator thereon.

In one form, the elongated spring assembly for the draft gear is comprised of a series of elastomeric pads arranged in axially stacked relation relative to each other. Each elastomeric pad comprising the elongated spring assembly has a durometer hardness ranging between about 40 and about 65 on a Shore D hardness scale.

In one form, the spring of the multipiece spring seat assembly includes an elastomeric pad having first and second generally planar surfaces extending in generally parallel relation relative to each other. The elastomeric pad of the multipiece spring seat assembly has a durometer hardness ranging between about 40 and about 50 on a Shore D hardness scale. In another form, the spring of the multipiece spring seat assembly includes a plurality of elastomeric pads which operate in unison relative to each other and with the elongated spring assembly of the draft gear.

In another family of embodiments there is provided a railroad freight car draft gear including an axially elongated metallic housing having a closed end, an open end, a spring chamber and a longitudinal axis extending between the ends. A friction clutch assembly is provided for absorbing axial impacts directed against one end of the draft gear. The friction clutch assembly includes a plurality of friction members, with each friction member having an outer surface angled relative to the longitudinal axis and arranged in sliding friction engagement with the open end of the housing. The friction clutch assembly further includes an actuator having a plurality of angled surfaces. One end of the actuator axially extends beyond the open end of the housing for receiving energy directed axially to draft gear. Each angled surface on the actuator is arranged in sliding friction engagement with an inner surface on each friction member. A multi-tiered spring assembly is centered and slidably fitted within a spring chamber of the housing and is comprised of a series of axially stacked individual elastomeric spring units for absorbing, dissipating and returning energy imparted to the actuator during operation of the draft gear. A spring seat assembly is arranged within the housing between the friction members and the multi-tiered spring assembly. The spring seat assembly includes a spring seat extending generally normal to the longitudinal axis and defining a surface arranged in contiguous relation with one end of the spring assembly. The seat assembly also includes a top plate arranged between the spring seat and each friction member of the friction clutch assembly. A spring is operably disposed between the spring seat and the top plate so as to allow for angling movements of the friction members during non-axial compression of the actuator relative to the draft gear housing.

In one embodiment, a lengthwise portion of the draft gear housing includes two pairs of joined sidewalls extending generally from the closed end toward the open end of the housing so as to provide the spring chamber in the housing with a generally rectangular cross-sectional configuration. In those draft gears wherein the hollow chamber has a generally rectangular cross-sectional configuration, a peripheral edge of the spring seat has a generally rectangular configuration, in plan, such that said spring seat has a particular orientation when operably arranged within the draft gear housing. Preferably, the spring seat has an indicator thereon for facilitating orientation of the spring seat assembly within the draft gear housing.

To facilitate assembly, at least one of the spring seat and the top plate preferably has, in combination with the spring of the spring seat assembly, cooperating instrumentalities for positioning the spring relative to the spring seat assembly. In one embodiment, the spring seat defines a pocket for receiving and accommodating one end of the spring. Preferably, the pocket is coaxially arranged relative to the axis of the draft gear housing. A marginal edge of the pocket defined by the spring seat preferably has a series of radially spaced upright supports arranged thereabout. When the spring seat assembly is operably arranged within the draft gear housing, the spring seat and top cap are designed to define a solid stop for the spring seat assembly. Preferably, and when the spring seat assembly is operably arranged within the draft gear housing, the supports on the spring seat underlie a lower end of the friction members such that an axial force directed against a free end of the friction members, such force is also directed through the spring seat to the multi-tiered spring assembly of the draft gear.

Preferably, each spring unit of the spring assembly for the draft gear is comprised of a series of elastomeric pads arranged in axially stacked relation relative to each other. Each elastomeric pad comprising the spring assembly has a durometer hardness ranging between about 40 and about a 65 on a Shore D hardness scale.

In one form, the spring of the spring seat assembly also includes an elastomeric pad having first and second ends with corresponding first and second generally planar surfaces extending in generally parallel relation relative to each other. The elastomeric pad of the spring of the multipiece spring seat assembly has a durometer hardness ranging between about 40 and about 50 on a Shore D hardness scale. The spring of the spring seat assembly can also be comprised of a series of elastomeric pads arranged in operable combination with each other and within the radial confines of the marginal edge of the pocket defined by the spring seat.

According to another aspect of this invention disclosure, there is provided a railroad freight car multipiece spring seat assembly including a spring seat, a top plate, and a spring. The spring seat is adapted to operably engage one end of a spring assembly in a railroad freight car draft gear. The top plate is adapted to operably engage with each of a plurality of friction shoes arranged in the railroad freight car draft gear. The spring of the multipiece spring seat assembly is operably disposed between the spring seat and the top plate.

In one form, a peripheral edge of the spring seat has a generally rectangular configuration, in plan, such that the spring seat has a particular orientation when operably arranged within a housing of a draft gear. Moreover, and to facilitate orientation of the spring seat assembly within a housing of a draft gear, the spring seat is provided with an indicator thereon.

Preferably, at least one of the spring seat and the top plate has, in combination with the spring of the spring seat assembly, cooperating instrumentalities for positioning said spring relative to said spring seat assembly. The spring seat preferably defines a pocket for receiving and accommodating one end of the spring.

The spring of the spring seat assembly preferably includes an elastomeric pad having first and second generally planar surfaces extending in generally parallel relation relative to each other. A marginal edge of the pocket defined by the spring seat has a series of radially spaced upright supports arranged thereabout for limiting radial expansion of the elastomeric pad in response to an axial loads being exerted upon the spring seat assembly. Preferably, the elastomeric pad of the spring of the multipiece spring seat assembly has a durometer hardness ranging between about 40 and about 50 on a Shore D hardness scale. Alternatively, the spring of the spring seat assembly can include multiple spring pads arranged in operable combination relative to each other. In another form, the pocket preferably defined by the spring seat assembly, and wherein the spring is arranged, can include radial projections which are designed to purposefully engage with and control radial bulge of the spring seat assembly spring.

DETAILED DESCRIPTION

While this invention disclosure is susceptible of embodiment in multiple forms, there is shown in the drawings and will hereinafter be described preferred embodiments, with the understanding the present disclosure sets forth exemplifications of the disclosure which are not intended to limit the disclosure to the specific embodiments illustrated and described.

Figure 1:
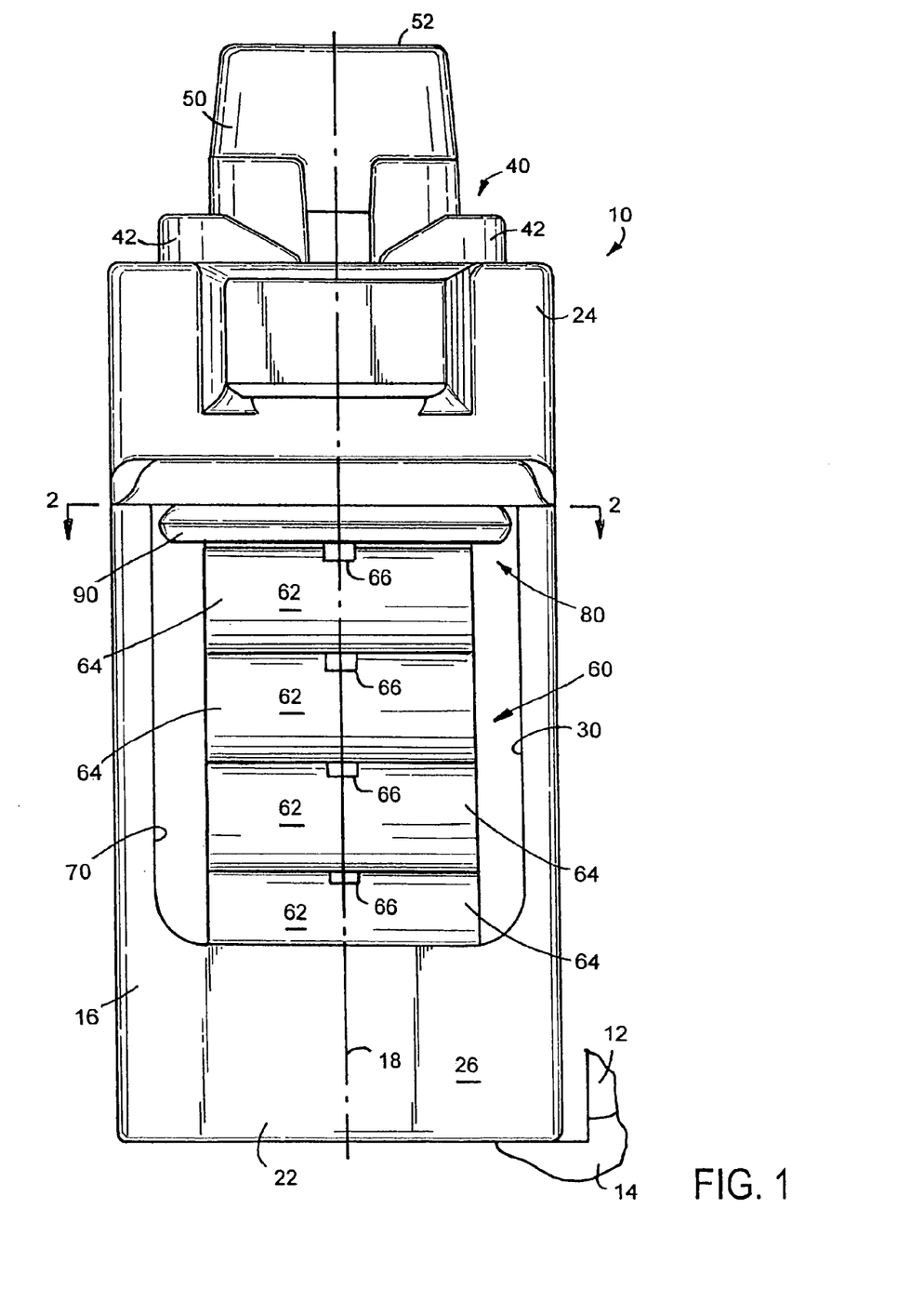
FIG. 1 is an elevational view of one form of railcar draft gear embodying principals and teachings of the present invention disclosure.

Referring now to the drawings, wherein like reference numerals indicate like parts throughout the several views, there is shown in FIG. 1 a railroad car draft gear, generally indicated by reference numeral 10, adapted to be carried within a yoke 12 arranged in operable combination with a centersill (not shown) of a railcar 14. Draft gear 10 includes an axially elongated hollow and metallic housing 16 defining a longitudinal axis 18 for the draft gear 10. Housing 16 is closed by an end wall 20 (FIG. 3) at a first or closed end 22 and is open toward an axially aligned second or open end 24.

The particular size and shape of the draft gear housing is not particularly relevant to this invention disclosure and it should be understood the illustrated draft gear housing is but one of any of a series of shapes and sizes to which this invention disclosure finds utility. In the embodiment illustrated for exemplary purposes in FIG. 2, housing 16 includes two pairs of joined and generally parallel walls 26, 26' and 28, 28', extending from the closed end 22 toward the open end 24 (FIG. 1) and defining a hollow spring chamber 30 within housing 16 (FIGS. 1 and 3). In the example illustrated in FIG. 2, the walls 26, 26' and 28, 28' provide the housing spring chamber 30 with a generally rectangular or boxlike cross-sectional configuration for a major lengthwise portion thereof.

Figure 3:
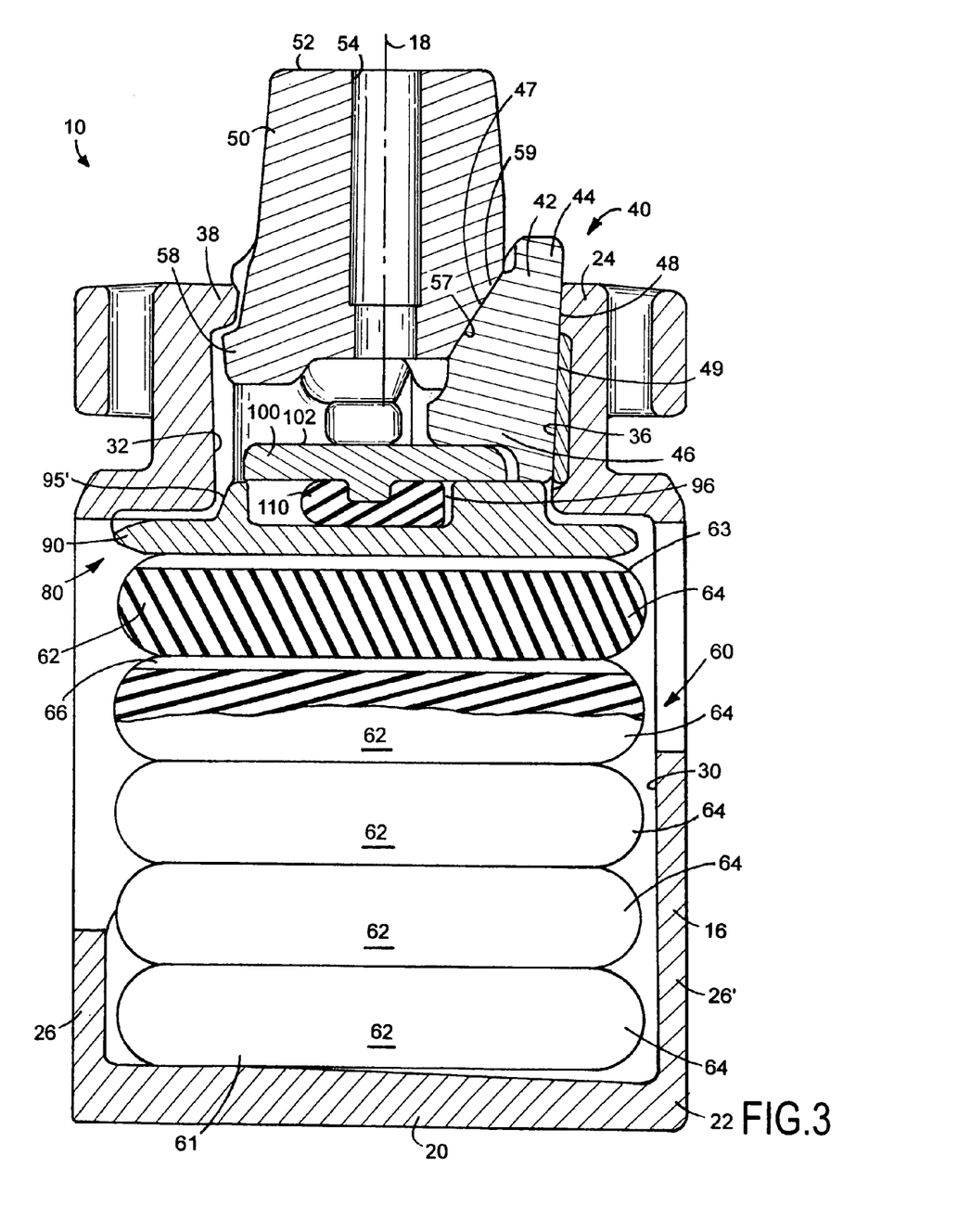
FIG. 3 is a longitudinal sectional view of the draft gear illustrated in FIG. 1.
Figure 4:
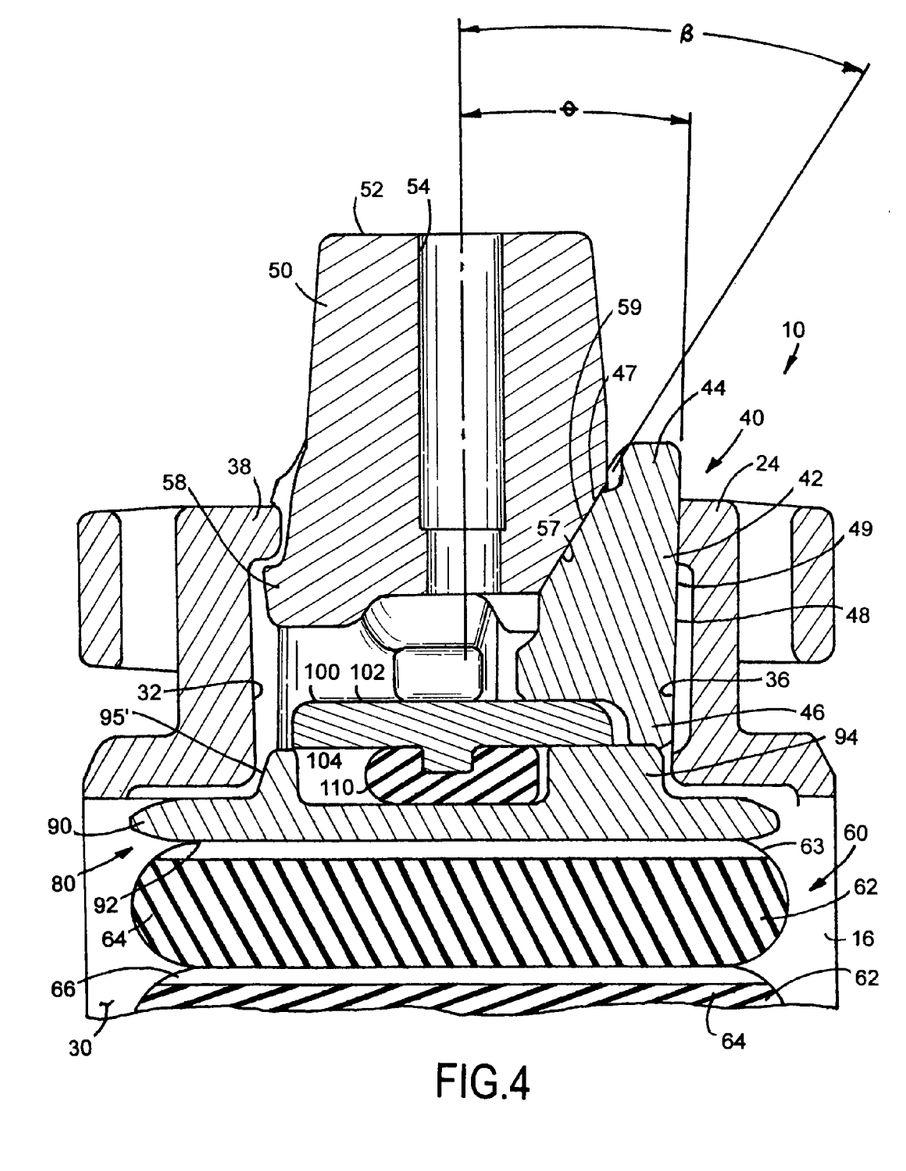
FIG. 4 is an enlarged sectional view of one end of the draft gear illustrated in FIG. 3.

As shown in FIGS. 3 and 4, the end 24 of draft gear housing 16 has a friction bore 32 which opens to spring chamber 30 and to end 24 of the draft gear housing 16. Moreover, and as shown in FIG. 3, the internal friction bore 32 is provided with a plurality (with only one being shown in FIGS. 3 and 4) of equi-angularly spaced and longitudinally extended tapered inner angled friction surfaces 36. The tapered inner angled friction surfaces 36 on housing 16 converge toward the longitudinal axis 18 and toward the closed end 22 of the draft gear housing 16. Preferably, housing 16 is provided with three equally spaced longitudinally extended and tapered inner angled friction surfaces 36 but more tapered surfaces could be provided without detracting or departing from the spirit and novel concept of this invention disclosure.

In the embodiment shown in FIG. 3, draft gear 10 is also provided with a friction clutch assembly 40 for absorbing draft forces or impacts axially directed against the draft gear 10. In the embodiment shown in FIG. 3, the friction clutch assembly 40 includes a plurality of friction members or shoes 42 arranged about axis 18 and in operable combination with the tapered inner angled friction surfaces 36 at the open end of the draft gear housing 16. The friction clutch assembly 40 can be provided with three equi-angularly spaced friction members 42 but more friction members could be provided without detracting or departing from the spirit and novel concept of this invention disclosure. In the embodiment shown by way of example in FIGS. 3 and 4, the number of friction members 42 forming part of the friction clutch assembly 40 are equal in number to the number of tapered inner angled friction surfaces 36 on housing 16.

Turning to FIG. 4, each friction member 42 has axially or longitudinally spaced first and second end 44 and 46, respectively. Moreover, each friction member 42 has an outer or external tapered sliding surface 48. When the draft gear 10 is assembled, each inner angled friction surface 36 on housing 16 combines with each outer tapered sliding surface 48 on each friction member to define a first angled friction sliding surface 49 therebetween. The first friction sliding surface 49 is disposed at an angle θ relative to the longitudinal axis 18 of the draft ger assembly 10. As will be appreciated by a person of ordinary skill in the art, the angle θ relative to the longitudinal axis 18 of the draft gear assembly 10 will be determined upon the particular force/travel curve performance desired for the draft gear 10.

In the illustrated embodiment, the friction clutch assembly 40 further includes a wedge member or actuator 50 arranged for axial movement relative to the open end 24 of housing 16. As shown in FIGS. 1, 3 and 4, an outer end 52 of the wedge member 50 preferably has a generally flat face and that extends beyond the open end 24 of housing 16 and is adapted to bear on the usual follower (not shown) of a railway draft rigging such that draft or impact forces can be axially applied to the draft gear 10 during operation of the railcar 10. As known, wedge member 50 is arranged in operable combination with the friction members 42.

Turning again to FIG. 4, wedge member 50 defines a plurality of outer tapered or angled friction surfaces 57 arranged in operable combination with the friction members 42 of the clutch assembly 40. Although only one friction surface 57 is shown in FIGS. 3 and 4, the number of friction surfaces 57 on wedge member 50 equals the number of fiction members 42 used as part of the friction clutch assembly 40. When the draft gear 10 is assembled, each outer angled friction surface 57 on wedge member 50 combines with an inner angled sliding surface 47 on each friction member 42 to define a second angled friction sliding surface 59 therebetween. The friction sliding surface 59 is disposed at an angle β relative to the longitudinal axis 18 of draft gear 10. As will be appreciated by a person of ordinary skill in the art, the angle β relative to the longitudinal axis 18 of the draft gear assembly 10 will be determined depending upon the particular force/travel curve performance desired for the draft gear 10.

Wedge member 50 is formed from any suitable metallic material. In a preferred form, wedge member 50 is formed from an austempered ductile iron material. Moreover, and as shown in FIGS. 3 and 4, the wedge member or actuator 50 defines a generally centralized longitudinally extending bore 54.

As shown in FIGS. 3 and 4, at its open end 20, housing 16 is provided with a series of radially inturned stop lugs 38 which are equi-angularly spaced circumferentially relative to each other. Toward a rear or inner end thereof, wedge member 50 includes a series of radially outwardly projecting lugs 58 which are equi-angularly disposed relative to each other and extend between adjacent friction members 42 so as to operably engage in back of the lugs 38 on housing 16 and facilitate assembly of the draft gear 10.

An axially elongated elastomeric spring assembly 60 is generally centered and slidable within spring chamber 30 of the draft gear housing 16 and forms a resilient column for storing dissipating and returning energy imparted or applied to the free or outer end 52 of wedge member 50 during axial compression of the draft gear 10. As known, spring assembly 60 is precompressed during assembly of the draft gear 10 and serves to maintain the components of the friction clutch assembly 40, including friction members 42 and wedge member 50, in operable combination relative to each other and within the draft gear housing 16. In the illustrated embodiment, spring assembly 60 develops about a 10,000 pound preload force for the draft gear 10 and is capable of absorbing, dissipating and returning impacts or energy directed axially thereto in the range of between 450,000 lbs. and about 700,000 lbs.

Spring assembly 60 can take a myriad of shapes and sizes without detracting or departing from the true spirt and novel concept of this invention disclosure. In the form shown in FIG. 3, spring assembly 60 has a first end 61 which engages with the wall 20 at the closed end 22 of the draft gear housing 16 and a second end 63 arranged in axially spaced relation from the spring assembly first end 61. In the embodiment illustrated by way of example in FIG. 3, spring assembly 60 is comprised of a plurality of individual units or springs 62 arranged in axially stacked relationship relative to each other. In the form shown in FIG. 3, each cushioning unit or spring 62 includes an elastomeric pad 64 having a generally rectangular shape so as to optimize the rectangular area of the hollow spring chamber 30 (FIG. 3) wherein spring assembly 60 is slidably centered for axial endwise movements in response to loads or impacts being exerted axially against the draft gear 10. Preferably, each elastomeric pad 64 is formed from a polyester material having a Shore D hardness ranging between about 40 and about 60 and an elastic strain to plastic strain ratio of about 1.5 to 1. Confronting faces or surfaces of any two axially adjacent elastomeric pads 64 are preferably provided with interlocking structure 66 for maintaining general alignment of the pads 64 within the spring chamber 30 of housing 16.

Figure 2:
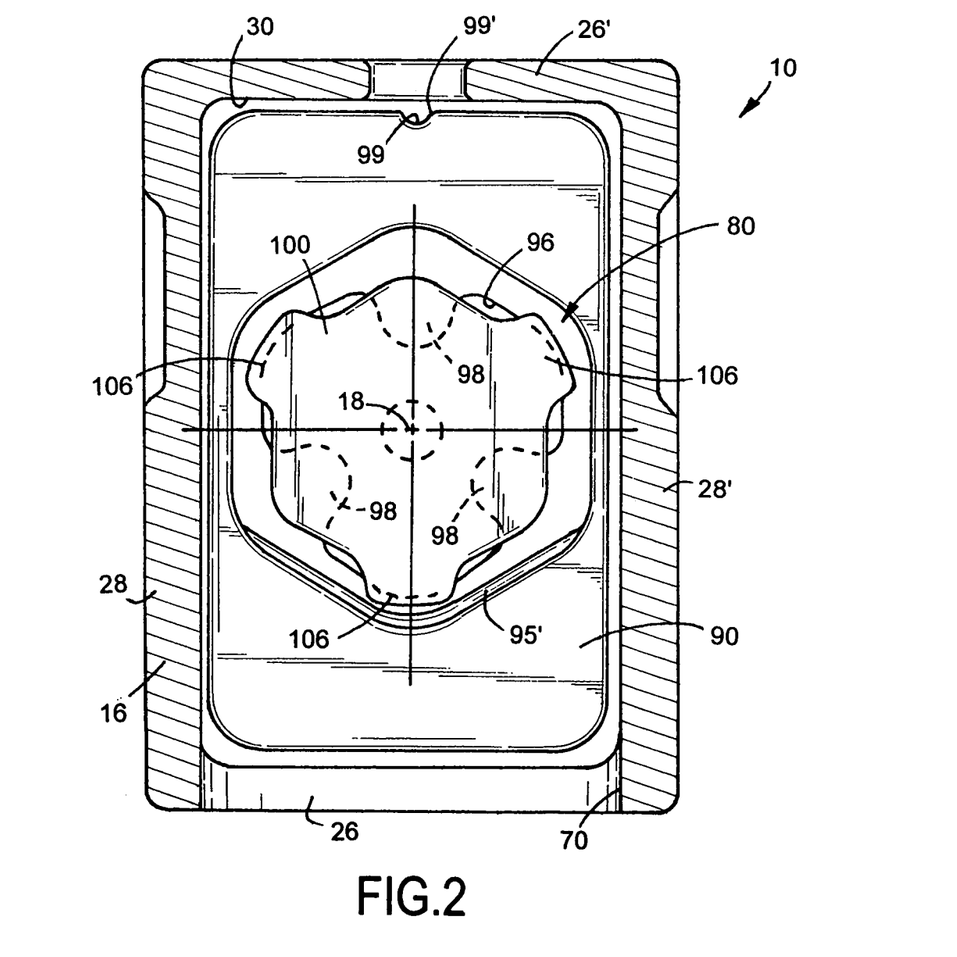
FIG. 2 is a sectional view taken along line 2-2 of FIG. 1.

As shown in FIGS. 1 and 2, a relatively large rectangular opening 70 is preferably formed in wall 26 of the draft gear housing 16. Opening 70 is sized such that one or more of the spring units 62 can be inserted through the opening 70 in a direction extending generally normal to the longitudinal axis 18 of the draft gear and into the hollow spring chamber 30 of housing 16. Moreover, and in the preferred form shown in FIG. 3, the draft gear housing end wall 20 is provided with a slight angle or slope of about 1.7° in a direction extending away from the opening 70 in the housing 16.

In accordance with the present invention disclosure, there is provided a multipiece spring seat assembly 80 arranged within the draft gear housing 16 and operably disposed between spring assembly 60 and a lower end of each friction member or shoe 42 of the friction clutch assembly 40. The multipiece spring set assembly 80 includes a spring seat 90 adapted to operably engage the second end 63 of spring assembly 60, a top plate 100 adapted to operably engage and support each of the plurality of friction members 42 of the friction clutch assembly 40, and a spring 110 operably disposed between the spring seat 90 and top plate 100.

As shown in FIG. 3, and when spring seat assembly 80 is operably arranged within the hollow spring chamber 30 of the draft gear housing 16, the spring seat 90 extends generally normal or perpendicular to the longitudinal axis 18 of the draft gear 10. As shown in FIG. 4, the spring seat 90 preferably has a generally planar spring engaging or contacting surface 92 which, when spring seat assembly 90 is arranged in operable relation with the draft gear 10, is arranged in contiguous relation relative to the second end 63 of the spring assembly 60. In the embodiment illustrated in FIGS. 2 and 6, a portion of spring seat 90 has a generally rectangular configuration, in plan, so as to fit within the hollow spring chamber 30 of the draft gear 10 (FIG. 2) and to optimize its contacting relation relative to the spring assembly 60.

In the form shown in FIG. 3 through 6, and on that side opposite from spring contacting surface 92, spring seat 90 preferably includes an upstanding projection 94 which, when the spring seat assembly 80 is arranged in operable relation relative to the draft gear 10, at least partially extends into the friction bore 32 of draft gear housing 16. Preferably, the projection 94 is centrally disposed on the spring seat 90. An upper end of the projection 94 defines a generally planar surface 95 extending generally parallel to the spring engaging or contacting surface 92. To facilitate operation of draft gear 10 (FIG. 1), and as shown in FIGS. 2, 3, 4 and 6, the projection 94 on spring seat 90 has an outer chamfer or angled edge 95' depending from the planar surface 95 and extending, at least partially, about projection 94. Spring seat 90 is formed from any suitable metallic material. In a preferred form, spring seat 90 is formed from an austempered ductile iron material.

Figure 5:
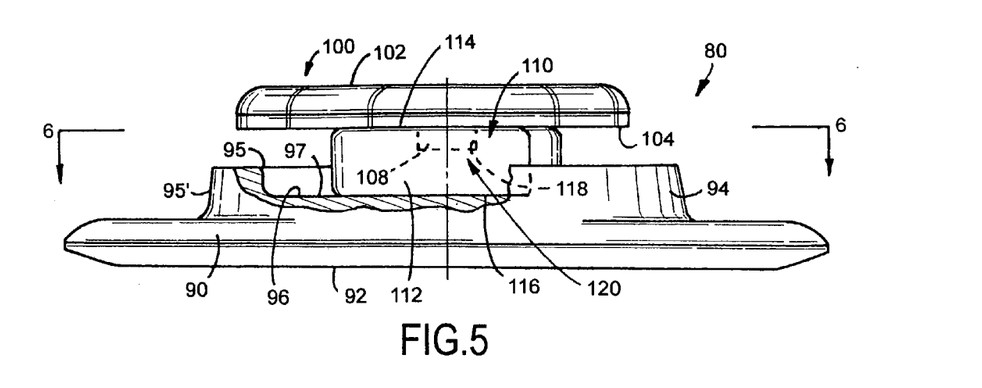
FIG. 5 is an enlarged elevational view of one form of multipiece spring seat assembly embodying principals and teachings of this invention disclosure shown in disassembled relation from the draft gear illustrated in FIGS. 1 through 4.
Figure 6:
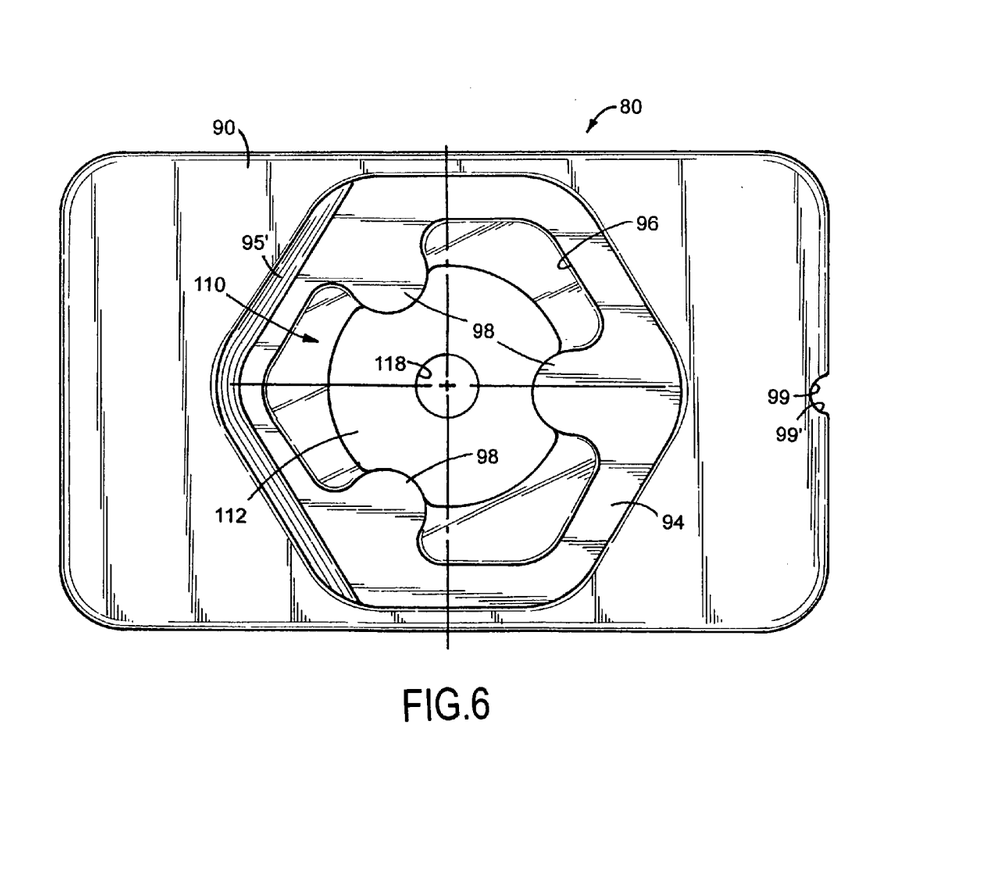
FIG. 6 is a top plan view of a spring seat forming part of this invention disclosure and taken along line 6-6 of FIG. 5.

In the preferred embodiment shown in FIGS. 5 and 6, the spring seat 90 of assembly 80 further defines a blind pocket or recess 96 which opens only to one side of the spring seat 90 and toward wedge 50 of the friction clutch assembly 40 (FIGS. 3 and 4). As shown in FIG. 5, the pocket or recess 96 defined by the spring seat 90 preferably has a generally flat supporting surface 97 extending generally parallel to spring contacting surface 92 of spring seat 90.

Moreover, for purposes described below, and as shown in FIG. 6, a marginal edge of the pocket or recess 96 has a series of equally spaced supports or pillars 98 arranged thereabout. In the illustrated embodiment, one end of the supports or pillars 98 on the spring seat 90 are contiguous with and depend from the generally planar surface 95 on the spring seat 90. Suffice it to say, the number of pillars or supports 98 forming part of the spring seat 90 are preferably equal in number and spacing to the number and spacing of the friction shoes or members 42 forming part of the friction clutch assembly 40. When the multipiece spring seat assembly 80 is arranged in operable combination with the draft gear 10, the pillars or supports 98 on spring seat 90 are arranged in substantial vertical alignment with and underlie the friction members 42 of clutch assembly 40.

Spring seat 90 furthermore preferably includes an indicator 99 for facilitating arrangement of the spring seat assembly 90 within spring chamber 30 of draft gear housing 16. The indicator 99 can take any of a myriad of designs without detracting or departing from the present invention disclosure. In the embodiment illustrated by way of example, however, indicator 99 is in the form of a notch or groove 99' provided on a peripheral edge of the spring seat 90 whereby indicating the preferred direction of insertion for the spring seat 90 and, more particularly, the orientation of the pillars or supports 98 on the spring seat 90 relative to the friction members 42 of the friction clutch assembly 40.

As shown in FIGS. 3 and 4, the top cap 100 of the multipiece spring seat assembly 80 engages with and supports the friction members 42 of the friction clutch assembly 40. More specifically, the top cap 100 defines an upper surface 102 which, when the spring seat assembly 80 is operably arranged in the draft gear 10, slidably supports the lower end of each friction member 42. When the multipiece spring seat assembly 80 is operably arranged in combination with the draft gear 10, the upper surface 102 of the top cap 100 extends generally normal or perpendicular to the longitudinal axis 18 of the draft gear 10. As shown in FIG. 5, the top cap 100 further defines a lower surface 104 arranged in generally parallel relation relative to the top surface 102 of cap 100. During operation, surface 104 of top cap 100 is designed to engage with surface 95 on the spring seat 90 so as to define a solid stop for the spring seat assembly 80.

The top cap 100 is formed from any suitable metallic material. In a preferred form, the top cap 100 is formed from an austempered ductile iron material. During the operation of the draft gear 10, and besides moving vertically within the friction bore 32 of the draft gear housing 16, the friction shoes or members 42 likewise move radially inwardly and outwardly relative to the longitudinal axis 18 of the draft gear 10. Forming the top cap 100 preferably from the austempered ductile iron adds lubricity of the contacting surface engagement between the friction members or shoes 42 and the upper supporting surface 102 of the top cap 100.

When the multipiece spring seat assembly 80 is arranged in operable combination within the draft gear housing 16, the top cap 100 is arranged in generally coaxial alignment with the spring seat 90. In the embodiment illustrated by way of example in FIG. 2, the top cap 100 of the spring seat assembly 80 is shown as having a plurality of equally spaced ears or supports 106 radiating outwardly from a center of the top cap 100.

The number of ears or supports 106 forming part of the top cap 100 are preferably equal in number and spacing to the number and spacing of the friction members 42 used in combination with the friction clutch assembly 40. Moreover, the number of ears or supports 106 forming part of the top cap 100 are preferably equal in number and spacing to number of pillars or supports 98 forming part of the spring seat 90.

As mentioned above, spring 110 is operably disposed between the spring seat 90 and the top cap 110. The purpose of spring 110 is to allow the multipiece spring seat assembly 80 to develop a predetermined secondary spring force to the friction clutch assembly 40 and ensure the friction shoes 42 and wedge 50 are quickly returned to their installed height following a relative high axial impact being directed against the draft gear 10 while maintaining a moderate spring force on spring assembly 60. Arranging spring 110 between the spring seat 90 and the top plate 100 of the spring seat assembly 80 furthermore compensates for some angling and unequal movements of the friction shoes 42 during non-axial compression of the wedge or actuator 50, i.e., as the railcar moves or travels through a curve.

As will be appreciated, the shape of spring 110 can vary from that illustrated for exemplary purposes without detracting or departing from the true spirit and scope of this invention disclosure. In one form, spring 110 is capable of developing at least 3,000 pounds of preload or preforce for the friction clutch assembly 40. Moreover, and in the illustrated embodiment, spring 100 is capable of withstanding an end load force ranging between about 15,000 to about 60,000 pounds. Of course the specific operating characteristics of spring 110 can be varied or different from those mentioned above without detracting or departing from the true spirit and scope of this invention disclosure.

In the embodiment shown by way of example in FIGS. 5 and 6, spring 110 includes a formed and resiliently deformable body 112 of elastomeric material having a predetermined length and a predetermined cross-sectional shape capable of developing the required preload force for the spring seat assembly 80. When the multipiece spring assembly 80 is operably arranged in housing 16 (FIGS. 3 and 4), spring 110 is generally coaxially aligned with the longitudinal axis 18 of the draft gear 10 and includes longitudinally spaced and generally parallel ends 114 and 116 (FIG. 5). One end 116 of spring 110 is received within the pocket or recess 96 of the spring seat 90. The spring end 116 preferably abuts against and extends generally parallel to support surface 97 on the spring seat 90. The other spring end 114 preferably abuts against and extends generally parallel to the lower surface 104 on the top cap 100.

To allow the spring seat assembly 80 to advantageously accomplish those purposes listed above, and as schematically shown in FIG. 5, before the multipiece spring seat assembly 80 is operably arranged in combination with the draft gear 10 (FIG. 1), the axial distance separating the opposed ends 114 and 116 of spring 110 is such that the lower surface 104 of top cap 100 is axially spaced from surface 95 on the spring seat 90. Preferably, and before the multipiece spring seat assembly 80 is operably arranged in combination with the draft gear 10 (FIG. 1), the axial distance between surfaces 114 ands 116 of spring 110 is such that an axial distance ranging between about 0.50 inches and about 0.987 inches separates surface 95 on the spring seat 90 from the lower surface 104 of the top cap 100. Of course, and depending upon the particular characteristics of the draft gear, the exact dimensions axially separating surface 95 on the spring seat 90 from the lower surface 104 of the top cap 100 can vary without detracting or departing from the spirt and scope of this invention disclosure.

The thermoplastic elastomer body 112 of spring 110 can be formed from a myriad of elastomeric materials. Preferably, the thermoplastic elastomer body 12 of spring 110 is formed from a copolyesther polymer elastomer sold by the DuPont Company under the tradename HYTREL™. Ordinarily, a HYTREL™ elastomer has inherent physical properties make it unsuitable for use as a spring. Applicants' assignee, however, advantageously discovered it is possible to impart spring-like characteristics to a HYTREL™ elastomer. Coassigned U.S. Pat. No. 4,198,037 to D. G. Anderson describes the above-noted polymer material and the forming process for converting it to a spring. Applicable portions of U.S. Pat. No. 4,198,037 to D. G. Anderson are incorporated herein by reference. Suffice it to say, spring 110 is preferably formed from the above-described thermoplastic material and has a plastic strain to elastic strain ratio greater than 1.5 to 1. Moreover, and in a preferred form, the elastomer forming the body 112 of spring 110 has an oriented molecular structure so as to enhance performance of the spring 110. Preferably, the elastomer used to form spring 110 has a durometer hardness ranging between about 40 and about 50 on a Shore D hardness scale.

In the embodiment illustrated in FIG. 6, the elastomer body 112 of spring 110 has a generally cylindrical like configuration between opposed ends thereof. The pillars or supports 98 around the marginal edge of the recess 96 in the spring seat 90 serve to capture and position the spring 110 relative to the spring seat 90. As will be appreciated, and after being arranged in operable combination with the draft gear 10 as well as during operation of the draft gear 10, the design of the pillars or supports 98 around the marginal edge of the recess 96 in the spring seat 90 can limit radial expansion or bulging of the spring 110 in response to an axial load being exerted upon the spring seat assembly 80 and can be designed to otherwise control the effectiveness of spring 110.

In the illustrated embodiment, the top cap 100 and spring 110 are cooperatively designed and configured to be interlocked relative to each other. It would be relatively simple, however, and as an alternative, to design the spring seat 90 and the spring 110 to be interlocked relative to each other. In the form shown in FIG. 5, the top cap 100 and the spring 110 have cooperating instrumentalities, generally identified by reference numeral 120, for securing the top plate 100 and spring 110 in operable combination relative to each other. As will be appreciated from an understanding of this invention disclosure, by securing the top cap 100 and spring 110 in operable combination relative to each other, such an arrangement likewise positions the top cap 100 relative to the spring seat 90.

The cooperating instrumentalities 120 can take a variety of different types for accomplishing the desired ends. In the embodiment illustrated by way of example in FIG. 4, the top cap 110 includes a projection 108 which depends from the lower surface 104 for an axial distance less than the distance separating the ends 114 and 116 of spring 110. Preferably, the projection 108 is formed integral with the top cap 110. In the embodiment illustrated by way of example in FIG. 6, the spring 110 defines a recess 118 which opens to at least the end 114 of spring 110 (FIG. 5) and which is sized to receive and accommodate the projection 108 on the top cap 100 there within so as to maintain the top cap 100 and spring 110 in operable combination.

Figure 7:
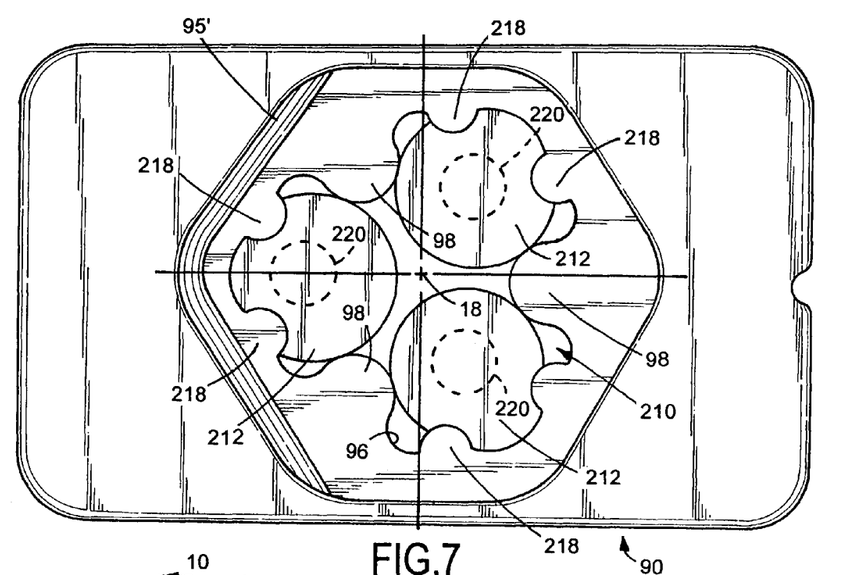
FIG. 7 is a top plan view of an alternative form of spring seat and spring.

FIG. 7 illustrates an alternative form for the spring of the spring seat assembly. The form of spring shown in FIG. 7 is designated generally by reference numeral 210. In the embodiment shown by way of example in FIG. 7, spring 210 includes a plurality of formed and resiliently deformable and preferably identical elastomeric pads 212. Each pad 212 has a predetermined length and a predetermined cross-sectional shape and which, when used in operable combination relative to each other, are capable of developing the required preload force for the spring seat assembly 80. While having a different outer diameter from the elastomer body 112 forming spring 110 (FIG. 5), the elastomer used to form each pad 212 is preferably similar to that discussed above and is preferably developed in the same manner as that described above regarding elastomer body 112 of spring 110.

When the multipiece spring assembly is operably arranged in the draft gear housing 16, the multiple pads 212 of spring 210 are equidistantly spaced relative to each other preferably with one end of each pad being disposed within the open-top pocket on the spring seat 90. An opposed end of each spring pad 212 preferably abuts against and extends generally parallel to the lower surface 104 on the top cap 100 (FIG. 5).

As shown in FIG. 7, the spring seat 90 can also be modified or otherwise altered from that shown in FIG. 6 to further enhance performance of spring assembly 210. As shown in FIG. 7, the marginal edge of the pocket or recess 96 can include one or more projections 218 disposed between any two supports or pillars 98 and extending toward the axis 18 of the draft gear 10 for engaging with a periphery or outer surface of each elastomeric pad 212. In operation, the projections 218 about the marginal edge of the pocket or recess 96 combine with the supports 98 to restrict and direct elastomer flow or radial bulging action of a respective spring pad 212 whereby modifying the spring load or operating performance of the respective spring pad 212 engaged by the projections 218. Moreover, as shown in FIG. 7, spring seat 90 and each spring pad 212 preferably have interlocking instrumentalities 220 for positioning and releasably maintaining the spring seat 90 and spring pads 212 in operable combination with each other.

Figure 8:
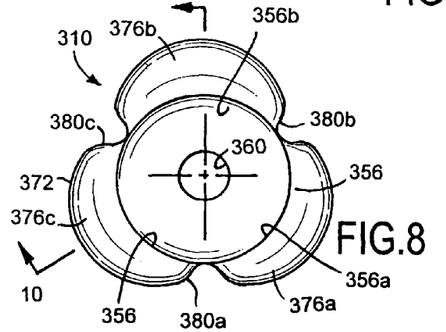
FIG. 8 is an enlarged top plan view of another alternative spring which can be used in combination with the spring seat assembly of this invention disclosure.
Figure 9:
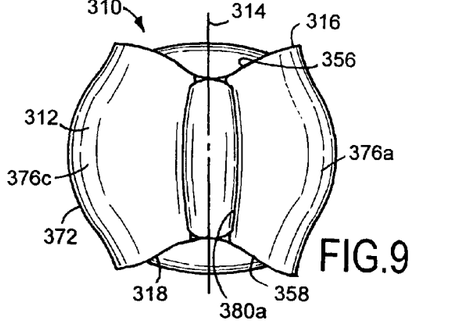
FIG. 9 is an elevational view of the spring illustrated in FIG. 8.
Figure 10:
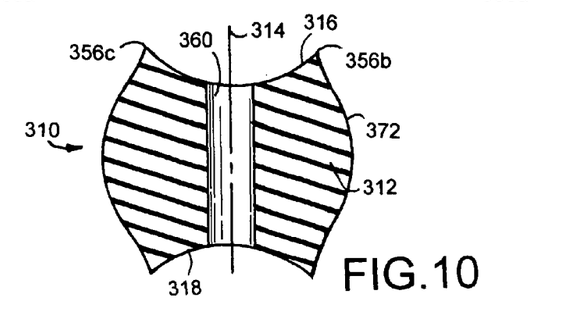
FIG. 10 is a sectional view taken along line 10-10 of FIG. 8.

FIGS. 8 through 10 illustrate another form of spring which can be used in combination with the spring seat assembly (FIG. 3). The spring shown in FIGS. 8 through 10 is designated generally by reference numeral 310. In the embodiment shown by way of example in FIGS. 8 through 10, spring 310 has a repeatable force/deflection curve with a substantially increasing rate. In one embodiment, spring 310 is capable of developing at least 1,000 pounds of preload or preforce for the side bearing assembly. Moreover, in the illustrated embodiment, spring 310 is capable of withstanding an end load force ranging between about 15,000 to about 60,000 pounds. Of course, the specific operating characteristics of spring 310 can be varied or different from those mentioned above without detracting or departing from the true spirt and scope of the present invention disclosure.

As shown in FIGS. 9 and 10, spring 310 includes an elongated elastomeric body 312 which is resiliently deformable in response to an axial load being applied thereto. The spring body 312 defines an axis 314 and includes longitudinally spaced ends 316 and 318. As shown, and when formed, the ends 316, 318 of the spring 310 preferably each have a generally convex shape or configuration extending generally normal to the axis 314. When used in operable combination with spring seat assembly 80, spring 310 preferably has no metal plates between the opposed ends 316 and 318 such that substantially the entire length of spring 310 is responsive to axial load applied thereto.

In the embodiment illustrated in FIGS. 8 and 10, the elastomeric body of spring 310 defines a generally centralized recess or hole 360 opening to at least one and preferably both ends 316, 318 of the spring 310. It should be appreciated, however, the elongated spring body 312 could also have a solid configuration without detracting or departing from the spirit and true scope of the invention disclosure. Moreover, member 312 can be formed as a composite structure similar to that disclosed in coassigned U.S. Pat. No. 5,868,384; the applicable portions of which are incorporated herein by reference.

Suffice it to say, the thermoplastic elastomer body 312 of spring 310 can be formed from a myriad of elastomeric materials. Like spring 110 discussed above, the thermoplastic elastomer body or member 312 is formed from a copolyesther polymer elastomer of the type manufactured and sold by the DuPont Company under the tradename HYTREL™. As mentioned, a HYTREL™ elastomer has inherent physical properties making it unsuitable for use as a spring. Applicants' assignee has advantageously discovered it is possible to impart spring-like characteristics to a HYTREL™ elastomer. The above-identified coassigned Anderson patent better describes the above noted polymer material and forming process and is herein incorporated by reference. Suffice it to say, spring 310 is preferably formed from the above-described thermoplastic material and has a plastic strain to elastic strain ratio greater than 1.5 to 1. Preferably, the elastomer used to form spring member 312 has a durometer hardness ranging between about 40 and about 50 on a Shore D hardness scale.

Spring body 312 also has a generally round circumferential outer surface identified generally by reference numeral 372 that is interrupted, in the illustrated example, by a plurality of substantially identical vertical interruptions or recesses 380a, 380b and 380c extending a majority of the vertical distance between the ends 316 and 318 and which are formed when the original height of the elastomeric spring body 312 is precompressed (the first compression) during the spring forming process whereby eliminating compression set characteristics of the elastomer material. In the illustrated embodiment, the recesses 380a, 380b and 380c are equidistantly spaced apart from each other and extend generally parallel to the axis 314 of spring 310. In the spring illustrated by way of example, the equidistant radial spacing between the recesses 380a, 380b and 380c generally conforms to the radial spacing between the supports or pillars 98 on the spring seat 90 when spring 310 is used in operable combination with spring set assembly 80.

In the embodiment illustrated by way of example in FIG. 8, and as a result of the spring formation, and with limited or no axial load being exerted upon spring 310, spring body 312 has an undulating circumferential ridge 356 extending about end 316 of spring 310 and an undulating circumferential ridge 358 extending about end 318 of spring 310. As shown in FIG. 8, a first portion 356a of the circumferential ridge 356 extends between recesses 380a and 380b. As shown in FIG. 8, a second portion 356b of the circumferential ridge 356, which is generally equal in length to the first portion 356a of ridge 356, extends between the recesses 380b and 380c. Moreover, and as shown in FIG. 8, a third portion 356c of the circumferential ridge 356, which is generally equal in length to the first and second portions 356a and 356b, respectively, of ridge 356, extends between the recesses 380c and 380a. The undulating circumferential ridge 358 extending about end 318, with limited or no axial load being exerted upon spring 310, is shaped with a like series of segments or portions Moreover, in the embodiment illustrated by way of example in FIGS. 8 through 10, the outer surface 372 of the elastomeric body 312 has three substantially identical outwardly radial bulging sections or lobes 376a, 376b and 376c longitudinally extending between the ends 316, 318 of the elastomeric body 312. Besides extending between the ends 316 and 318 of the elastomeric body 312, the outwardly bulging section or lobe 376a extends and is formed between the recesses 380a and 380b. Similarly, and besides extending between the ends 316 an 318 of the elastomeric body 312, the outwardly bulging section or lobe 376b extends and is formed between the recesses 380b and 380c. Besides extending between the ends 316 an 318 of the elastomeric body 312, the outwardly bulging section or lobe 376c extends and is formed between the recesses 380c and 380a on the elastomeric body 312. Besides being generally rounded between the respective recesses which define the lateral limits of each bulging section, the outer surface 372 of each bulging section or lobe also has a generally concave longitudinal shape or configuration.

Upon precompression of the preform, the molecular structure of the elastomer is beneficially oriented such that the spring 310 results with advantageous characteristics. Moreover, and upon precompression of the spring preform, especially in the area of the recesses 380a, 380b and 380c, wherein radial expansion of the elastomer has been limited, the molecular structure of the elastomer appears to be ,beneficially oriented to provide spring 310 with characteristics which are heretofore unknown during the spring forming process.

When arranged in operable combination with the draft gear 10, the multipiece spring seat assembly 80 is particularly useful after a relative high impact force is directed against the draft gear 10. It is during this period the multipiece spring seat assembly 80 provides a predetermined secondary spring force to the friction clutch assembly 40 whereby ensuring the friction shoes 42 and wedge 50 are maintained in relation with the friction bore 32 of the draft gear housing and are quickly returned to their installed height. Moreover, the multipiece spring seat assembly 80 maintains a moderate spring force on spring assembly 60. Arranging spring 110 between the spring set 90 and the top plate 100 of the spring seat assembly 80 furthermore compensates for some angling and unequal movements of the friction shoes 42 during non-axial compression of the wedge or actuator 50, i.e., as the railcar moves or travels through a curve.

From the foregoing, it will be observed that numerous modifications and variations can be made and effected without departing or detracting from the true spirit and novel concept of this invention disclosure. Moreover, it will be appreciated, the present disclosure is intended to set forth an exemplification which is not intended to limit the disclosure to the specific embodiment illustrated. Rather, this disclosure is intended to cover by the appended claims all such modifications and variations as fall within the spirit and scope of the claims.

What is claimed is:

1. A railroad freight car draft gear, comprising:
  a hollow housing open at a first end and closed toward a second end, said housing defining a longitudinal axis for said draft gear;
  a series of friction members radially spaced about said longitudinal axis and arranged in operable combination with the open end of said housing;
  a wedge arranged for axial movement relative to the open end of said housing and against which an exterior force can be applied, with said wedge being arranged in operable combination with said series of friction members;
  an elongated spring assembly disposed within said hollow housing for returning energy applied to said wedge during axial compression of said draft gear, with a first end of said spring assembly being arranged in contacting relation with the closed end of said housing; and
  a multipiece spring seat assembly arranged within said housing, with said spring seat assembly including a spring seat extending generally normal to the longitudinal axis of said draft gear and defining a surface arranged in contacting relation with a second end of said spring assembly, with said spring seat assembly also including a top plate arranged between said spring seat and each friction member, and with said spring seat assembly further including a plurality of elastomeric springs arranged in radially spaced relation relative to each other, with said springs being operably disposed between said spring seat and said top plate.

2. The railroad freight car draft gear according to claim 1, wherein said spring seat of said spring seat assembly defines a pocket for receiving and accommodating one end of said springs.

3. The railroad freight car draft gear according to claim 1, wherein the spring seat of said spring seat assembly has an indicator thereon for facilitating arrangement of said spring seat assembly within said housing.

4. The railroad freight car draft gear according to claim 1, wherein said elongated spring assembly is comprised of a series of elastomeric pads arranged in axially stacked relation relative to each other.

5. The railroad freight car draft gear according to claim 4, wherein each elastomeric pad comprising the elongated spring assembly has a durometer hardness ranging between about 40 and about 65 on a Shore D hardness scale.

6. The railroad freight car draft gear according to claim 5, wherein each spring of said multipiece spring seat assembly includes an elastomeric pad having first and second generally planar surfaces extending in generally parallel relation relative to each other.

7. The railroad freight car draft gear according to claim 6, wherein the elastomeric pad of each spring of said multipiece spring seat assembly has a durometer hardness ranging between about 40 and about 50 on a Shore D hardness scale.

8. The railroad freight car draft gear according to claim 1, wherein the top plate of said multipiece spring seat assembly includes a series of ears radiating outwardly from a center of said top plate, with the series of ears on said top plate being equal in number to the friction members.

9. A railroad freight car draft gear, comprising:
a hollow housing open at a first end and closed toward a second end, said housing defining a longitudinal axis for said draft gear;
a series of friction members radially spaced about said longitudinal axis and arranged in operable combination with the open end of said housing;
a wedge arranged for axial movement relative to the open end of said housing and against which an exterior force can be applied, with said wedge being arranged in operable combination with said series of friction members;
an elongated spring assembly disposed within said hollow housing for returning energy applied to said wedge during axial compression of said draft gear, with a first end of said spring assembly being arranged in contacting relation with the closed end of said housing: and
a multipiece spring seat assembly arranged within said housing, with said spring seat assembly including a spring seat extending generally normal to the longitudinal axis of said draft gear and defining a surface arranged in contacting relation with a second end of said spring assembly, with said spring seat also defining a pocket, and wherein a marginal edge of the pocket defined by the spring seat of said spring seat assembly has a series of radially spaced upright supports arranged thereabout, with one support on said spring seat, when said spring seat assembly is operably arranged within said housing, underlying one of said friction members, with said spring seat assembly also including a top plate arranged between said spring seat and each friction member, and with said spring seat assembly further including a spring having one end accommodated in said pocket, with said spring being operably disposed between said spring seat and said top plate.

10. The railroad freight car draft gear according to claim 9, wherein at least one of said spring seat and said top plate of said spring seat assembly has, in combination with the spring of said spring seat assembly, cooperating instrumentalities for positioning said spring relative to said spring seat assembly.

11. A railroad freight car draft gear, comprising:
an axially elongated metallic housing having a closed end, an open end, a spring chamber, and a longitudinal axis extending between said ends;
a friction clutch assembly for absorbing axial impacts directed against one end of said draft gear, said friction clutch assembly including a plurality of friction members, with each friction member having an outer surface angled relative to said longitudinal axis and arranged in sliding friction engagement with the open end of said housing, with said friction clutch assembly further including an actuator having a plurality of angled surfaces, with one end of said actuator axially extending beyond the open end of said housing for receiving energy directed axially to draft gear, and with each angled surface on said actuator being arranged in sliding friction engagement with an inner surface on each friction member;
a multi-tiered spring assembly fitted within the spring chamber of said housing and comprised of a series of axially stacked individual elastomeric units for absorbing, dissipating and returning energy imparted to said actuator during operation of said draft gear; and
a spring seat assembly arranged within said housing, said spring seat assembly including a spring seat extending generally normal to said longitudinal axis and defining a surface arranged in contacting relation with one end of said spring assembly, with said spring seat assembly also including a top plate arranged between said spring seat and each friction member of said friction clutch assembly, and with said spring seat assembly further including a plurality of radially spaced springs operably disposed between said spring seat and said top plate.

12. The railroad freight car draft gear according to claim 11, wherein a lengthwise portion of said housing includes two pairs of joined sidewalls extending generally from said closed end toward the open end of said housing so as to provide the spring chamber with a generally rectangular cross-sectional configuration.

13. The railroad freight car draft gear according to claim 12, wherein a peripheral edge of the spring seat of said spring seat assembly has a generally rectangular configuration, in plan, such that said spring seat has a particular orientation when operably arranged within said housing.

14. The railroad freight car draft gear according to claim 13, wherein the spring seat of said spring seat assembly has an indicator thereon for facilitating orientation of said spring seat assembly within said housing.

15. The railroad freight car draft gear according to claim 11, wherein the spring seat of said spring seat assembly defines a pocket for receiving and accommodating one end of each spring of said spring seat assembly.

16. The railroad freight car draft gear according to claim 15, wherein the pocket defined by the spring seat of said spring seat assembly is coaxially arranged relative to the longitudinal axis of said housing.

17. The railroad freight car draft gear according to claim 11, wherein said multi-tiered spring assembly is comprised of a series of elastomeric pads arranged in axially stacked relation relative to each other.

18. The railroad freight car draft gear according to claim 17, wherein each elastomeric pad comprising said multi-tiered spring assembly has a durometer hardness ranging between about 40 and about 65 on a Shore D hardness scale.

19. The railroad freight car draft gear according to claim 18, wherein the springs of said spring seat assembly each include an elastomeric pad having first and second ends.

20. The railroad freight car draft gear according to claim 19, wherein each elastomeric pad of the springs of said multipiece spring seat assembly has a durometer hardness ranging between about 40 and about 50 on a Shore D hardness scale.

21. The railroad freight car draft gear according to claim 11, wherein the top plate of said multipiece spring seat assembly includes a plurality of ears radiating outwardly from a center of said top plate, with the plurality of ears on said top plate being equal in number to the plurality of friction members of said friction clutch assembly.

22. A railroad freight car draft gear, comprising:
an axially elongated metallic housing having a closed end, an open end, a spring chamber, and a longitudinal axis extending between said ends;
a friction clutch assembly for absorbing axial impacts directed against one end of said draft gear, said friction clutch assembly including a plurality of friction members, with each friction member having an outer surface angled relative to said longitudinal axis and arranged in sliding friction engagement with the open end of said housing, with said friction clutch assembly further including an actuator having a plurality of angled surfaces, with one end of said actuator axially extending beyond the open end of said housing for receiving energy directed axially to draft gear, and with each angled surface on said actuator being arranged in sliding friction engagement with an inner surface on each friction member;
a multi-tiered spring assembly fitted within the spring chamber of said housing and comprised of a series of axially stacked individual elastomeric units for absorbing, dissipating and returning energy imparted to said actuator during operation of said draft gear: and
a spring seat assembly arranged within said housing, said spring seat assembly including a spring seat extending generally normal to said longitudinal axis and defining a surface arranged in contacting relation with one end of said spring assembly. with said spring seat defining a pocket, and wherein a marginal edge of the pocket defined by said spring seat has a series of radially spaced upright supports arranged thereabout, with one support on the spring seat, when said spring seat assembly is operably arranged within said housing, underlying one of said friction members, and with said spring seat assembly also including a top plate arranged between said spring seat and each friction member of said friction clutch assembly, and with said spring seat assembly further including a spring having one end accommodated in said pocket, and with said spring being operably disposed between said spring seat and said top plate.

23. The railroad freight car draft gear according to claim 22, wherein at least one of said spring seat and said top plate of said spring seat assembly has, in combination with the spring of said spring seat assembly, cooperating instrumentalities for positioning said spring relative to said spring seat assembly.

24. A railroad freight car multipiece spring seat assembly, comprising:
a spring seat adapted to operably engage one end of a spring assembly in a railroad freight car draft gear;
a top plate adapted to operably engage with a distal end of each of a plurality of friction shoes arranged in said railroad freight car draft gear; and
a plurality of radially spaced springs operably disposed between said spring seat and said top plate.

25. The railroad freight multipiece spring seat assembly according to claim 24, wherein a peripheral edge of said spring seat has a generally rectangular configuration, in plan, such that said spring seat has a particular orientation when operably arranged within a housing of a draft gear.

26. The railroad freight car multipiece spring seat assembly according to claim 24, wherein said spring seat has an indicator thereon for facilitating orientation of said spring seat assembly within a housing of a draft gear.

27. The railroad freight car multipiece spring seat assembly according to claim 24, wherein said spring seat defines a pocket for receiving and accommodating one end of each spring.

28. The railroad freight car multipiece spring seat assembly according to claim 27, wherein the springs of said spring seat assembly each include an elastomeric pad having first and second generally planar surfaces extending in generally parallel relation relative to each other.

29. The railroad freight car multipiece spring seat assembly according to claim 28, wherein the elastomeric pad of each spring of said multipiece spring seat assembly has a durometer hardness ranging between about 40 and about 50 on a Shore D hardness scale.

30. The railroad freight car multipiece spring seat assembly according to claim 24, wherein said top plate includes a plurality of ears radiating outwardly from a center of said top plate.

31. A railroad freight car multipiece spring seat assembly, comprising:
a spring seat adapted to operably engage one end of a spring assembly in a railroad freight car draft gear;
a top plate adapted to operably engage with a distal end of each of a plurality of friction shoes arranged in said railroad freight car draft gear;
a spring operably disposed between said spring seat and said top plate. wherein said spring includes an elastomeric pad having first and second generally planar surfaces extending in generally parallel relation relative to each other
wherein said spring seat defines a pocket for receiving and accommodating one end of said spring, and wherein a marginal edge of the pocket defined by said spring seat has a series of radially spaced upright supports arranged thereabout for limiting radial expansion of said elastomeric pad in response to an axial load being exerted upon said spring seat assembly.

32. The railroad freight car multipiece spring seat assembly according to claim 31, wherein at least one of said spring seat and said top plate has, in combination with said spring of said spring seat assembly, cooperating instrumentalities for positioning said spring relative to said spring seat assembly.

33. The railroad freight car multipiece spring seat assembly according to claim 31, wherein the elastomeric pad of the spring of said multipiece spring seat assembly has a durometer hardness ranging between about 40 and about 50 on a Shore D hardness scale.

* * * * *